US012699977B1

(12) United States Patent
Rezayee et al.

(10) Patent No.: US 12,699,977 B1
(45) Date of Patent: Aug. 4, 2026

(54) WIRELESS TRANSACTION DEVICE WITH HYBRID COMMUNICATIONS

(71) Applicant: Block, Inc., Oakland, CA (US)

(72) Inventors: Afshin Rezayee, Richmond Hill (CA); Malcolm Smith, Toronto (CA); Sergei Mosends, Oakville (CA)

(73) Assignee: Block, Inc., Oakland, CA (US)

( * ) Notice: Subject to any disclaimer, the term of this patent is extended or adjusted under 35 U.S.C. 154(b) by 600 days.

(21) Appl. No.: 17/880,511

(22) Filed: Aug. 3, 2022

Related U.S. Application Data

(63) Continuation of application No. 14/863,642, filed on Sep. 24, 2015, now abandoned.

(51) Int. Cl.
| *G06Q 20/20* | (2012.01) |
| *G06Q 20/12* | (2012.01) |
(Continued)

(52) U.S. Cl.
CPC ........... *G06Q 20/202* (2013.01); *G06Q 20/12* (2013.01); *G06Q 20/325* (2013.01);
(Continued)

(58) Field of Classification Search
CPC ... G06Q 20/3278; G06Q 20/425; H04W 4/80; G06F 9/4411
See application file for complete search history.

(56) References Cited

U.S. PATENT DOCUMENTS

| 3,128,349 A | 4/1964 | Boesch et al. |
| 4,776,003 A | 10/1988 | Harris |
(Continued)

FOREIGN PATENT DOCUMENTS

| AU | 2324402 A | 6/2002 |
| CA | 3 018 797 A1 | 10/2017 |
(Continued)

OTHER PUBLICATIONS

Examination Report for European Patent Application No. 18159594.3, mailed Oct. 18, 2019.
(Continued)

*Primary Examiner* — Patrick Mcatee
*Assistant Examiner* — Sima Asgari
(74) *Attorney, Agent, or Firm* — Polsinelli PC

(57) ABSTRACT

A wireless communication device includes first and second wireless communication interfaces for communicating with a second device. The first wireless communication interface communicates according to a first wireless communication protocol and the second wireless communication interface communicates according to a second wireless communication protocol. The second wireless communication protocol is associated with a higher data rate and a higher power consumption than the first wireless communication protocol. The second device sends a message to the wireless communication device. Based on that message, certain hardware of the wireless communication device is enabled, including the second wireless communication interface. The wireless communication device and the second device then establish a connection according to the second wireless communication protocol and communicate via that connection.

20 Claims, 6 Drawing Sheets

(51) Int. Cl.

| | |
|---|---|
| *G06Q 20/32* | (2012.01) |
| *G06Q 30/0251* | (2023.01) |
| *H04W 36/14* | (2009.01) |
| *H04W 36/16* | (2009.01) |
| *H04W 52/02* | (2009.01) |
| *H04W 88/06* | (2009.01) |

(52) U.S. Cl.

CPC ........ *G06Q 30/0253* (2013.01); *H04W 36/14* (2013.01); *H04W 36/165* (2013.01); *H04W 52/0209* (2013.01); *H04W 88/06* (2013.01)

(56) References Cited

U.S. PATENT DOCUMENTS

| | | | |
|---|---|---|---|
| 4,860,336 | A | 8/1989 | D' Avello et al. |
| 5,221,838 | A | 6/1993 | Gutman et al. |
| 5,351,296 | A | 9/1994 | Sullivan |
| 5,388,155 | A | 2/1995 | Smith |
| 5,408,513 | A | 4/1995 | Busch, Jr. et al. |
| 5,434,395 | A | 7/1995 | Storck et al. |
| 5,679,945 | A | 10/1997 | Renner et al. |
| 5,714,741 | A | 2/1998 | Pieterse et al. |
| 5,729,591 | A | 3/1998 | Bailey |
| 5,740,232 | A | 4/1998 | Pailles et al. |
| 5,838,773 | A | 11/1998 | Eisner et al. |
| 5,850,599 | A | 12/1998 | Seiderman |
| D405,070 | S | 2/1999 | Kitagawa et al. |
| 5,867,795 | A | 2/1999 | Novis et al. |
| D411,524 | S | 6/1999 | Kitagawa et al. |
| 5,940,510 | A | 8/1999 | Curry et al. |
| 6,010,067 | A | 1/2000 | Elbaum |
| 6,088,431 | A | 7/2000 | LaDue |
| 6,098,881 | A | 8/2000 | Deland, Jr. et al. |
| 6,144,336 | A | 11/2000 | Preston et al. |
| 6,167,383 | A | 12/2000 | Henson |
| 6,234,389 | B1 | 5/2001 | Valliani et al. |
| 6,278,779 | B1 | 8/2001 | Bryant et al. |
| 6,481,623 | B1 | 11/2002 | Grant et al. |
| D491,953 | S | 6/2004 | Arakaki et al. |
| D495,700 | S | 9/2004 | Mukai et al. |
| D500,039 | S | 12/2004 | Chen |
| 6,886,742 | B2 | 5/2005 | Stoutenburg et al. |
| 6,990,683 | B2 | 1/2006 | Itabashi |
| 7,003,316 | B1 | 2/2006 | Elias et al. |
| 7,066,382 | B2 | 6/2006 | Kaplan |
| 7,083,090 | B2 | 8/2006 | Zuili |
| 7,163,148 | B2 | 1/2007 | Durbin et al. |
| D537,445 | S | 2/2007 | Bousfield |
| 7,210,627 | B2 | 5/2007 | Morley et al. |
| 7,424,732 | B2 | 9/2008 | Matsumoto et al. |
| 7,433,452 | B2 | 10/2008 | Taylor et al. |
| D598,013 | S | 8/2009 | Ju et al. |
| 7,591,425 | B1 | 9/2009 | Zuili et al. |
| 7,673,799 | B2 | 3/2010 | Hart et al. |
| D624,912 | S | 10/2010 | Chen et al. |
| D624,915 | S | 10/2010 | Sanchez |
| 7,810,729 | B2 | 10/2010 | Morley, Jr. |
| 7,860,789 | B2 | 12/2010 | Hirka et al. |
| 7,896,248 | B2 | 3/2011 | Morley, Jr. |
| D641,740 | S | 7/2011 | Jeon et al. |
| D650,377 | S | 12/2011 | Akana et al. |
| 8,086,531 | B2 | 12/2011 | Litster et al. |
| D653,664 | S | 2/2012 | Turnbull et al. |
| D654,885 | S | 2/2012 | Isaias |
| 8,126,734 | B2 | 2/2012 | Dicks et al. |
| D656,097 | S | 3/2012 | Nomi et al. |
| D657,784 | S | 4/2012 | Akana et al. |
| D660,834 | S | 5/2012 | Akana et al. |
| 8,265,553 | B2 | 9/2012 | Cheon et al. |
| D675,173 | S | 1/2013 | Paradise et al. |
| D676,047 | S | 2/2013 | White et al. |
| 8,397,988 | B1 | 3/2013 | Zuili |
| D680,537 | S | 4/2013 | Miller et al. |
| D681,639 | S | 5/2013 | Cruz et al. |
| D686,198 | S | 7/2013 | Lewis et al. |
| D688,241 | S | 8/2013 | Miller et al. |
| 8,532,270 | B2 | 9/2013 | Katis et al. |
| D696,255 | S | 12/2013 | Bousfield et al. |
| D700,606 | S | 3/2014 | Lo |
| D702,239 | S | 4/2014 | Lee et al. |
| D704,176 | S | 5/2014 | Kwak et al. |
| D705,201 | S | 5/2014 | Isaacs et al. |
| D706,266 | S | 6/2014 | Rotsaert |
| D709,069 | S | 7/2014 | Cruz et al. |
| D711,876 | S | 8/2014 | McWilliam et al. |
| 8,818,867 | B2 | 8/2014 | Baldwin et al. |
| D716,304 | S | 10/2014 | Orthey |
| D719,561 | S | 12/2014 | Akana et al. |
| 9,020,853 | B2 | 4/2015 | Hoffman et al. |
| 9,058,172 | B2 | 6/2015 | Babu et al. |
| 9,063,737 | B2 | 6/2015 | Babu et al. |
| D736,207 | S | 8/2015 | Bousfield et al. |
| D740,285 | S | 10/2015 | Templeton |
| D740,286 | S | 10/2015 | Templeton |
| D740,819 | S | 10/2015 | Weber et al. |
| D740,820 | S | 10/2015 | Templeton et al. |
| 9,390,297 | B2 | 7/2016 | Babu et al. |
| D766,238 | S | 9/2016 | Nguyen |
| D766,901 | S | 9/2016 | Nguyen |
| 9,507,972 | B2 | 11/2016 | Babu et al. |
| D774,510 | S | 12/2016 | Rotsaert |
| D776,658 | S | 1/2017 | Zhu et al. |
| 9,542,678 | B1 | 1/2017 | Glashan et al. |
| 9,576,159 | B1 | 2/2017 | Templeton et al. |
| D780,731 | S | 3/2017 | Kim et al. |
| 9,635,495 | B2 | 4/2017 | Kwan et al. |
| 9,679,286 | B2 | 6/2017 | Colnot et al. |
| D797,739 | S | 9/2017 | Templeton |
| D797,740 | S | 9/2017 | Nguyen |
| 9,800,293 | B2 | 10/2017 | Smith et al. |
| 9,864,424 | B1 | 1/2018 | Templeton et al. |
| 9,870,557 | B2 | 1/2018 | Babu et al. |
| 9,980,304 | B2 | 5/2018 | Huang et al. |
| 10,242,357 | B1 | 3/2019 | Dorogusker et al. |
| 2002/0091633 | A1 | 7/2002 | Proctor |
| 2002/0153414 | A1 | 10/2002 | Stoutenburg et al. |
| 2003/0009705 | A1 | 1/2003 | Thelander et al. |
| 2003/0135418 | A1 | 7/2003 | Shekhar et al. |
| 2003/0154414 | A1 | 8/2003 | von Mueller et al. |
| 2003/0183691 | A1 | 10/2003 | Lahteenmaki et al. |
| 2004/0012875 | A1 | 1/2004 | Wood |
| 2004/0041911 | A1 | 3/2004 | Odagiri et al. |
| 2004/0056091 | A1 | 3/2004 | Overhultz et al. |
| 2004/0059682 | A1 | 3/2004 | Hasumi et al. |
| 2004/0087339 | A1 | 5/2004 | Goldthwaite et al. |
| 2004/0167820 | A1 | 8/2004 | Melick et al. |
| 2004/0177132 | A1 | 9/2004 | Zhang et al. |
| 2004/0204082 | A1 | 10/2004 | Abeyta |
| 2005/0097015 | A1 | 5/2005 | Wilkes et al. |
| 2005/0109841 | A1 | 5/2005 | Ryan et al. |
| 2005/0221858 | A1* | 10/2005 | Hoddie ................ H04W 28/16 |
| | | | 455/557 |
| 2005/0236480 | A1 | 10/2005 | Vrotsos et al. |
| 2006/0032905 | A1 | 2/2006 | Bear et al. |
| 2006/0049255 | A1 | 3/2006 | von Mueller et al. |
| 2006/0142058 | A1 | 6/2006 | Elias et al. |
| 2006/0157565 | A1 | 7/2006 | Shiomi |
| 2006/0219776 | A1 | 10/2006 | Finn |
| 2006/0223580 | A1 | 10/2006 | Antonio et al. |
| 2007/0067833 | A1 | 3/2007 | Colnot |
| 2007/0079156 | A1 | 4/2007 | Fujimoto |
| 2007/0147332 | A1 | 6/2007 | Lappetelainen et al. |
| 2007/0168300 | A1 | 7/2007 | Quesselaire et al. |
| 2007/0194104 | A1 | 8/2007 | Fukuda et al. |
| 2007/0198436 | A1 | 8/2007 | Weiss |
| 2008/0091617 | A1 | 4/2008 | Hazel et al. |
| 2008/0137586 | A1 | 6/2008 | Jones et al. |
| 2008/0287062 | A1 | 11/2008 | Claus et al. |
| 2009/0070583 | A1 | 3/2009 | von Mueller et al. |
| 2009/0106571 | A1 | 4/2009 | Low et al. |
| 2009/0112768 | A1 | 4/2009 | Hammad et al. |
| 2009/0164326 | A1 | 6/2009 | Bishop et al. |
| 2009/0291705 | A1 | 11/2009 | Bennett |
| 2010/0057620 | A1 | 3/2010 | Li et al. |

(56) References Cited

U.S. PATENT DOCUMENTS

| | | | |
|---|---|---|---|
| 2010/0070785 A1 | 3/2010 | Fallin et al. | |
| 2010/0243732 A1 | 9/2010 | Wallner | |
| 2010/0257101 A1* | 10/2010 | Fierro | G06Q 20/3823 |
| | | | 705/64 |
| 2010/0268648 A1* | 10/2010 | Wiesman | G06Q 20/12 |
| | | | 235/379 |
| 2010/0269059 A1 | 10/2010 | Othmer et al. | |
| 2010/0308976 A1 | 12/2010 | Seban et al. | |
| 2011/0029416 A1 | 2/2011 | Greenspan | |
| 2011/0070834 A1 | 3/2011 | Griffin et al. | |
| 2011/0096710 A1 | 4/2011 | Liu et al. | |
| 2011/0110263 A1 | 5/2011 | Yi et al. | |
| 2011/0153437 A1 | 6/2011 | Archer et al. | |
| 2011/0312271 A1 | 12/2011 | Ma et al. | |
| 2011/0313922 A1 | 12/2011 | Ben | |
| 2012/0016760 A1 | 1/2012 | Lee et al. | |
| 2012/0089461 A1 | 4/2012 | Greenspan | |
| 2012/0118959 A1 | 5/2012 | Sather et al. | |
| 2012/0126010 A1 | 5/2012 | Babu et al. | |
| 2012/0126011 A1 | 5/2012 | Lamba et al. | |
| 2012/0132712 A1 | 5/2012 | Babu et al. | |
| 2012/0150673 A1 | 6/2012 | Hart | |
| 2012/0312879 A1 | 12/2012 | Rolin et al. | |
| 2013/0018740 A1 | 1/2013 | Fisher | |
| 2013/0052950 A1 | 2/2013 | Hillan et al. | |
| 2013/0069768 A1 | 3/2013 | Madhyastha et al. | |
| 2013/0117139 A1 | 5/2013 | DiMattina et al. | |
| 2013/0124348 A1 | 5/2013 | Lal et al. | |
| 2013/0163510 A1 | 6/2013 | Chakravarthy et al. | |
| 2013/0166402 A1 | 6/2013 | Parento et al. | |
| 2013/0256414 A1 | 10/2013 | Liu et al. | |
| 2013/0260690 A1 | 10/2013 | Cha | |
| 2013/0314214 A1 | 11/2013 | Leica et al. | |
| 2014/0001264 A1* | 1/2014 | Babu | G06F 1/3287 |
| | | | 235/440 |
| 2014/0127995 A1 | 5/2014 | Hendricksen et al. | |
| 2014/0129441 A1 | 5/2014 | Blanco et al. | |
| 2014/0149240 A1 | 5/2014 | Ansel et al. | |
| 2014/0157016 A1 | 6/2014 | Rajagopal | |
| 2014/0171108 A1 | 6/2014 | Waters et al. | |
| 2014/0372781 A1 | 12/2014 | Klappert | |
| 2015/0058227 A1 | 2/2015 | Dua | |
| 2015/0073983 A1* | 3/2015 | Bartenstein | G06Q 20/325 |
| | | | 705/41 |
| 2015/0127182 A1 | 5/2015 | Inagi et al. | |
| 2015/0148093 A1* | 5/2015 | Huang | H04W 52/0225 |
| | | | 29/428 |
| 2015/0248152 A1 | 9/2015 | Postea et al. | |
| 2015/0312703 A1 | 10/2015 | Maldari et al. | |
| 2016/0117813 A1 | 4/2016 | Gross et al. | |
| 2016/0180325 A1* | 6/2016 | Davis | G06Q 20/40 |
| | | | 705/44 |
| 2016/0275478 A1 | 9/2016 | Li et al. | |
| 2017/0286943 A1 | 10/2017 | Glashan et al. | |
| 2017/0289795 A1 | 10/2017 | Glashan et al. | |

FOREIGN PATENT DOCUMENTS

| | | | |
|---|---|---|---|
| CN | 101977100 A | 2/2011 | |
| DE | 20320080 U1 | 4/2004 | |
| EP | 0895203 A2 | 2/1999 | |
| EP | 1 874 014 A2 | 1/2008 | |
| EP | 2 136 499 A1 | 12/2009 | |
| EP | 3 361 455 A1 | 8/2018 | |
| EP | 3 543 971 A1 | 9/2019 | |
| EP | 3 437 226 B1 | 7/2021 | |
| FR | 2812744 A1 | 2/2002 | |
| FR | 2812745 A1 | 2/2002 | |
| FR | 2834156 A1 | 6/2003 | |
| JP | 109231285 A | 9/1997 | |
| JP | 2000-030146 A | 1/2000 | |
| JP | 2000-276539 A | 10/2000 | |
| JP | 2001-222595 A | 8/2001 | |
| JP | 2002-074507 A | 3/2002 | |
| JP | 2002-123771 A | 4/2002 | |
| JP | 2002-279320 A | 9/2002 | |
| JP | 2002-352166 A | 12/2002 | |
| JP | 2002-358285 A | 12/2002 | |
| JP | 2003-108777 A | 4/2003 | |
| JP | 2003-281453 A | 10/2003 | |
| JP | 2003-308438 A | 10/2003 | |
| JP | 2004-054651 A | 2/2004 | |
| JP | 2004-062733 A | 2/2004 | |
| JP | 2004-078553 A | 3/2004 | |
| JP | 2004-078662 A | 3/2004 | |
| JP | 2004-120651 A | 4/2004 | |
| JP | 2004-199405 A | 7/2004 | |
| JP | 2005-236923 A | 9/2005 | |
| JP | 2008-533826 A | 8/2008 | |
| JP | 4248820 B2 | 4/2009 | |
| JP | 2011-526455 A | 10/2011 | |
| JP | 2012-147146 A | 8/2012 | |
| JP | 2020-129799 A | 8/2020 | |
| KR | 10-1999-0066397 A | 8/1999 | |
| KR | 10-1999-0068618 A | 9/1999 | |
| KR | 200225019 B1 | 3/2001 | |
| KR | 10-2003-0005936 A | 1/2003 | |
| KR | 10-2003-0005984 A | 1/2003 | |
| KR | 10-2003-0012910 A | 2/2003 | |
| KR | 200333809 B1 | 11/2003 | |
| KR | 10-2004-0016548 A | 2/2004 | |
| KR | 100447431 B1 | 8/2004 | |
| KR | 200405877 B1 | 1/2006 | |
| KR | 100649151 B1 | 11/2006 | |
| KR | 10-2007-0107990 A | 11/2007 | |
| KR | 100842484 B1 | 6/2008 | |
| KR | 10-1140919 B1 | 5/2012 | |
| RU | 2284578 C1 | 9/2006 | |
| WO | 1998/012674 A2 | 3/1998 | |
| WO | 2000/011624 A1 | 3/2000 | |
| WO | 2000/025277 A1 | 5/2000 | |
| WO | 2001/086599 A2 | 11/2001 | |
| WO | 2002/033669 A1 | 4/2002 | |
| WO | 2002/043020 A2 | 5/2002 | |
| WO | 2002/082388 A1 | 10/2002 | |
| WO | 2002/084548 A1 | 10/2002 | |
| WO | 2003/044710 A1 | 5/2003 | |
| WO | 2003/079259 A1 | 9/2003 | |
| WO | 2004/023366 A1 | 3/2004 | |
| WO | 2006/131708 A1 | 12/2006 | |
| WO | 2012/003892 A1 | 1/2012 | |
| WO | 2014/008310 A1 | 1/2014 | |
| WO | 2014/106183 A1 | 7/2014 | |
| WO | 2016/015209 A1 | 2/2016 | |
| WO | 2017/173126 A1 | 10/2017 | |
| WO | 2018/118332 A1 | 6/2018 | |

OTHER PUBLICATIONS

Extended European Search Report for European Patent Application No. 18159594.3, mailed May 8, 2018.

Extended European Search Report for European Patent Application No. 19168542.9, mailed Oct. 7, 2019.

Final Office Action mailed Jun. 12, 2018, for U.S. Appl. No. 14/861,398, of Dorogusker, J., et al., filed Sep. 22, 2015.

Final Office Action mailed Nov. 29, 2018, for U.S. Appl. No. 15/088,021, of Glashan, R., et al., filed Mar. 31, 2016.

Final Office mailed Aug. 9, 2019, for U.S. Appl. No. 14/863,642, of Rezayee, A., et al., filed Sep. 24, 2015.

First Examination Report for Indian Design Patent Application No. 277744, mailed Mar. 8, 2016.

First Examination Report for Indian Design Patent Application No. 277745, mailed Mar. 11, 2016.

Intention to Grant for European Patent Application No. 19168542.9, mailed Jun. 15, 2021.

Intention to grant mailed for European Patent Application No. 13 740 420.8 , mailed Mar. 17, 2020.

Intention to grant mailed for European Patent Application No. 13 740 420.8 , mailed May 21, 2019.

Intention to grant mailed for European Patent Application No. 17 719 068.3 , mailed Aug. 24, 2020.

(56)　　　　References Cited

OTHER PUBLICATIONS

Intention to grant mailed for European Patent Application No. 17 719 068.3 , mailed Jan. 29, 2021.

International Search Report and Written Opinion for International Application No. PCT/US2013/049162, mailed Oct. 16, 2013.

International Search Report and Written Opinion for International Application No. PCT/US2017/025106, mailed Jul. 03. 2017.

International Search Report and Written Opinion for International Application No. PCT/US2017/062890, mailed Jan. 22, 2018.

Japanese Search Report mailed Sep. 20, 2019, for Japanese Patent Application No. 2018-550541.

Non-Final Office Action mailed Dec. 27, 2018, for U.S. Appl. No. 15/294,430, of Glashan, R., et al., filed Oct. 14, 2016.

Non-Final Office Action mailed Dec. 28, 2018, for U.S. Appl. No. 14/863,642, of Rezayee, A., et al., filed Sep. 24, 2015.

Non-Final Office Action mailed Jan. 21, 2016, for U.S. Appl. No. 14/709,375, of Babu, A., et al., filed May 11, 2015.

Non-Final Office Action mailed Jul. 9, 2015, for U.S. Appl. No. 14/709,375, of Babu, A., et al., filed May 11, 2015.

Non-Final Office Action mailed Jul. 30, 2020, for U.S. Appl. No. 14/863,642, of Rezayee, A., et al., filed Sep. 24, 2015.

Non-Final Office Action mailed Mar. 22, 2017, for U.S. Appl. No. 15/390,247, of Templeton, T., et al., filed Dec. 23, 2016.

Non-Final Office Action mailed May 3, 2018, for U.S. Appl. No. 15/088,021, of Glashan, R., et al., filed Mar. 31, 2016.

Non-Final Office Action mailed May 8, 2014, for U.S. Appl. No. 13/603,941, of Babu, A., et al., filed Sep. 5, 2012.

Non-Final Office Action mailed May 12, 2014, for U.S. Appl. No. 13/603,992, of Babu, A., et al., filed Sep. 5, 2012.

Non-Final Office Action mailed May 19, 2017, for U.S. Appl. No. 15/336,597, of Babu, A., et al., filed Oct. 27, 2016.

Non-Final Office Action mailed Nov. 30, 2017, for U.S. Appl. No. 14/861,398, of Dorogusker, J., et al., filed Sep. 22, 2015.

Non-Final Office Action mailed Sep. 29, 2021, for U.S. Appl. No. 14/863,642, of Rezayee, A., et al., iled Sep. 24, 2015.

Notice of Allowance for Canadian Patent Application No. 3018797, mailed Aug. 12, 2020.

Notice of Allowance mailed Apr. 10, 2019, for U.S. Appl. No. 15/294,430, of Glashan, R., et al., filed Oct. 14, 2016.

Notice of Allowance mailed Aug. 30, 2016, for U.S. Appl. No. 15/088,013, of Glashan, R., et al., filed Mar. 31, 2016.

Notice of Allowance mailed Aug. 30, 2017, for U.S. Appl. No. 15/390,247, of Templeton, T., et al., filed Dec. 23, 2016.

Notice of Allowance mailed Feb. 9, 2015, for U.S. Appl. No. 13/603,992, of Babu, A., et al., filed Sep. 5, 2012.

Notice of Allowance mailed Feb. 17, 2015, for U.S. Appl. No. 13/603,941, of Babu, A., et al., filed Sep. 5, 2012.

Notice of Allowance mailed Jul. 28, 2016, for U.S. Appl. No. 14/709,375, of Babu, A., et al., filed May 11, 2015.

Notice of Allowance mailed Jun. 5, 2015, for Design U.S. Appl. No. 29/447,767, of Templeton, T., filed Mar. 6, 2013.

Notice of Allowance mailed Jun. 12, 2017, for Design U.S. Appl. No. 29/539,783, of Templeton, T., filed Sep. 17, 2015.

Notice of Allowance mailed Mar. 9, 2016, for U.S. Appl. No. 14/874,301, of Babu, A., et al., filed Oct. 2, 2015.

Notice of Allowance mailed Mar. 26, 2019, for U.S. Appl. No. 15/088,021, of Glashan, R., et al., filed Mar. 31, 2016.

Notice of Allowance mailed May 12, 2017, for Design U.S. Appl. No. 29/575,535, of Nguyen, A.P., filed Aug. 25, 2016.

Notice of Allowance mailed May 17, 2016, for Design U.S. Appl. No. 29/528,683, of Nguyen, A.P., filed May 29, 2015.

Notice of Allowance mailed May 17, 2016, for Design U.S. Appl. No. 29/532,633, of Nguyen, A.P., filed Jul. 8, 2015.

Notice of Allowance mailed Nov. 7, 2018, for U.S. Appl. No. 14/861,398, of Dorogusker, J., et al., filed Sep. 22, 2015.

Notice of Allowance mailed Sep. 8, 2017, for U.S. Appl. No. 15/336,597, of Babu, A., et al., filed Oct. 27, 2016.

Office Action for European Patent Application No. 13 740 420.8, mailed Feb. 7, 2017.

Restriction Requirement mailed Jul. 24, 2018, for U.S. Appl. No. 14/863,642, of Rezayee, A., et al., filed Sep. 24, 2015.

Summons to attend oral proceedings for European Patent Application No. 13 740 420.8, mailed Aug. 31, 2018.

Summons to attend oral proceedings for European Patent Application No. 13 740 420.8, mailed Sep. 16, 2019.

Summons to attend oral proceedings for European Patent Application No. 18159594.3, mailed Jan. 28, 2022.

"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.

"Embedded FINancial transactional IC card READer," Retrieved from the URL: https://cordis.europa.eu/project/rcn/58338/factsheet/en.

"Guideline for the Use of Advanced Authentication Technology," FIPS 190, Sep. 28, 1994.

"Identification cards—Recording technique—Part 4—Location of read-only magnetic tracks—Track 1 and 2," ISO/IEC 7811-4:1995, International Organization for Standardization, Aug. 1995.

"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing—rev1.pdf Apr. 14, 2008.

"MSP430x1xx Family User's Guide," (including 2016 correction sheet at 2), Texas Instruments Inc., 2006.

Fried, I., "Stampt Aims to Take the Coffee Shop Punch Card Digital," dated Jul. 20, 2011, Retrieved from the Internet URL: http://allthingsd.com/20110720/stampt-aims-to-take-the coffee-shop-punch-card-digital/, on Nov. 16, 2015, pp. 1-3.

Geethapriya Venkataramani and Srividya Gopalan., "Mobile phone based RFID architecture for secure electronic payments using RFID credit cards," 2007 IEEE, (ARES'07).

Huang, S.H., et al., "Computer-assisted supply chain configuration based on supply chain operations reference (SCOR) model," Computers & Industrial Engineering, Elsevier, vol. 48, Issue 2, pp. 377-394 ( Mar. 2005 ).

Jerome Svigals., "The Long Life and Imminent Death of the Mag-stripe Card," IEEE Spectrum, vol. 49, Issue 61, Jun. 2012.

Jorgensen, A., "Square," Andrew Jorgensen Family, dated Nov. 19, 2010, Retrieved from the Internet URL: http://andrew.jorgensenfamily.us/2010/11/square/, on Jun. 6, 2014, pp. 1-3.

Martha E. Haykin et al., "Smart Card Technology: New Methods for Computer Access Control," NIST Special Publication 500-157, Sep. 1988.

Reitz, S., "Tabbedout: The Iphone App that lets you close your Tab without really opening one," dated Apr. 9, 2012, retrieved from the Internet URL: http://www.dallasobserver.com/restaurants/tabbedout-theiphone-app-that-lets-you-close-your-tab-without-really-opening-one-7025599, on Nov. 19, 2015, pp. 1-2.

Shaivitz, M., "MICROS Announces Partnership with TabbedOut: Big Nod for Mobile Payment Acceptance," dated May 11, 2011, Retrieved from the Internet URL: http://tech.co/micros-tabbedout-2011-05, on Nov. 16, 2015, pp. 1-5.

Spegele, Joseph Brain., "A Framework for Evaluating Application of Smart Cards and Related Technology Within the Department of Defense," Naval Postgraduate School, Jan. 1995.

Stephen A. Sherman et al., "Secure Network Access Using Multiple Applications of AT&T's Smart Card," AT&T Technical Journal, Sep./Oct. 1994.

Thomas, T., "iPhone Credit Card Readers," Top Ten Reviews, dated Feb. 11, 2011, Retrieved from the Internet URL: http://credit-card-processingreview.toptemeviews.com/mobile-credit-card-processing/iphone-credit-card-readers-og9.html, on Jun. 6, 2014, pp. 1-3.

Walsh, M., "Stampt App To End Paper Loyalty Cards," dated Jul. 24, 2011, Retrieved from the Internet URL: http://loyalty360.org/resources/article/stampt-app-to-end-paper-loyalty-cards, on Nov. 16, 2015, pp. 1-6.

Advisory Action mailed Aug. 10, 2018, for U.S. Appl. No. 14/861,398, of Dorogusker, J., et al., filed Sep. 22, 2015.

Advisory Action mailed Feb. 14, 2019, for U.S. Appl. No. 15/088,021, of Glashan, R., et al., filed Mar. 31, 2016.

(56) References Cited

OTHER PUBLICATIONS

Advisory Action mailed Oct. 24, 2019, for U.S. Appl. No. 14/863,642, of Rezayee, A., et al., filed Sep. 24, 2015.

Certificate of Industrial Design Registration for Australian Design Patent Application No. 201516287 mailed Dec. 15, 2015.

Certificate of Industrial Design Registration for Australian Design Patent Application No. 201516289 mailed Dec. 15, 2015.

Certificate of Industrial Design Registration for Canadian Design Patent Application No. 165620 mailed on Jun. 23, 2016.

Certificate of Industrial Design Registration for Canadian Design Patent Application No. 165621 mailed on Jun. 23, 2016.

Certificate of Industrial Design Registration for European Design Patent Application No. 002873877-0001, mailed Nov. 23, 2015.

Certificate of Industrial Design Registration for European Design Patent Application No. 002873877-0002, mailed Nov. 23, 2015.

Certificate of Industrial Design Registration for Indian Design Patent Application No. 277744, mailed Aug. 23, 2016.

Certificate of Industrial Design Registration for Indian Design Patent Application No. 277745, mailed Sep. 26, 2016.

Certificate of Industrial Design Registration for Japanese Design Patent Application No. 2015-026521, mailed Aug. 12, 2016.

Certificate of Industrial Design Registration for Japanese Design Patent Application No. 2015-026523, mailed Aug. 12, 2016.

Corrected Notice of Allowance mailed Sep. 25, 2017, for U.S. Appl. No. 15/390,247, of Templeton, T., et al., filed Dec. 23, 2016.

Decision to Grant for European Patent Application No. 19168542.9, mailed Jul. 29, 2021.

Decision to grant mailed for European Patent Application No. 13740420.8 , mailed Jul. 23, 2020.

Decision to grant mailed for European Patent Application No. 17 719 068.3 , mailed Jun. 17, 2021.

English-language translation of Decision of Registration for Japanese Design Patent Application No. 2015-026521, mailed Jul. 5, 2016.

English-language translation of Decision of Registration for Japanese Design Patent Application No. 2015-026523, mailed Jul. 5, 2016.

English-Language Translation of Decision to grant mailed for Japanese Patent Application No. 2018-550541, mailed Feb. 7, 2020.

English-Language Translation of Decision to Grant mailed for Japanese Patent Application No. 2020-033691, mailed Oct. 18, 2021.

English-language translation of First Office Action for Japanese Design Patent Application No. 2015-026521, mailed Mar. 15, 2016.

English-language translation of First Office Action for Japanese Design Patent Application No. 2015-026523, mailed Mar. 15, 2016.

English-Language Translation of First Office Action mailed for Japanese Patent Application No. 2020-033691, mailed Mar. 26, 2021.

Ex Parte Quayle Action mailed Apr. 9, 2015, for Design U.S. Appl. No. 29/447,767, of Templeton, T., filed Mar. 6, 2013.

Examination Report for Canadian Patent Application No. 3018797, mailed Aug. 20, 2019.

Examination Report for European Design Patent Application No. 002873877-0001/002873877-0002, mailed Dec. 1, 2015.

Final Office mailed Feb. 2, 2022, for U.S. Appl. No. 14/863,642, of Rezayee, A., et al., filed Sep. 24, 2015.

Final Office mailed Apr. 4, 2022, for U.S. Appl. No. 14/863,642, of Rezayee, A., et al., filed Sep. 24, 2015.

Summons to attend oral proceedings for European Patent Application No. 19168542.9, mailed Feb. 17, 2020.

Summons to attend oral proceedings for European Patent Application No. 19168542.9, mailed Jun. 2, 2020.

Preliminary Opinion for European Patent Application No. 18159594.3, mailed Sep. 7, 2022.

* cited by examiner

300

400

WIRELESS TRANSACTION DEVICE WITH HYBRID COMMUNICATIONS

CROSS-REFERENCE TO RELATED APPLICATIONS

The present application is a continuation of U.S. patent application Ser. No. 14/863,642, entitled "Wireless Transaction Device with Hybrid Communications," filed on Sep. 24, 2015, which application is incorporated herein by reference.

BACKGROUND

Retail transactions such as purchases may be performed with payment devices such as a credit card or a NFC-enabled smart phone running a payment application. A traditional payment terminal may reside at a fixed location and may have a physical connection to a power source such as an AC outlet. The payment terminal may also be physically connected to a wired communication interface such as a phone line or Ethernet connection. The payment terminal receives payment information such as a credit card number from the payment device and communicates with a remote server such as a payment server to determine whether the transaction is approved.

Such a traditional payment terminal may not be suitable for many businesses. Taxis, food trucks, delivery services, professional service providers, and other similar businesses engage in transactions from a vehicle or at disparate locations. Applications running on a mobile device such as smart phone or tablet may provide a user interface to facilitate payment transactions and a communication interface for communicating with the payment server. However, a separate reader device may be necessary in order to interface with the payment device. The reader device and mobile device may communicate wirelessly, and the reader device may be battery powered such that it can be easily moved to the location where the payment transaction will occur. Such a reader device may not be connected to a power source for an extended period of time.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
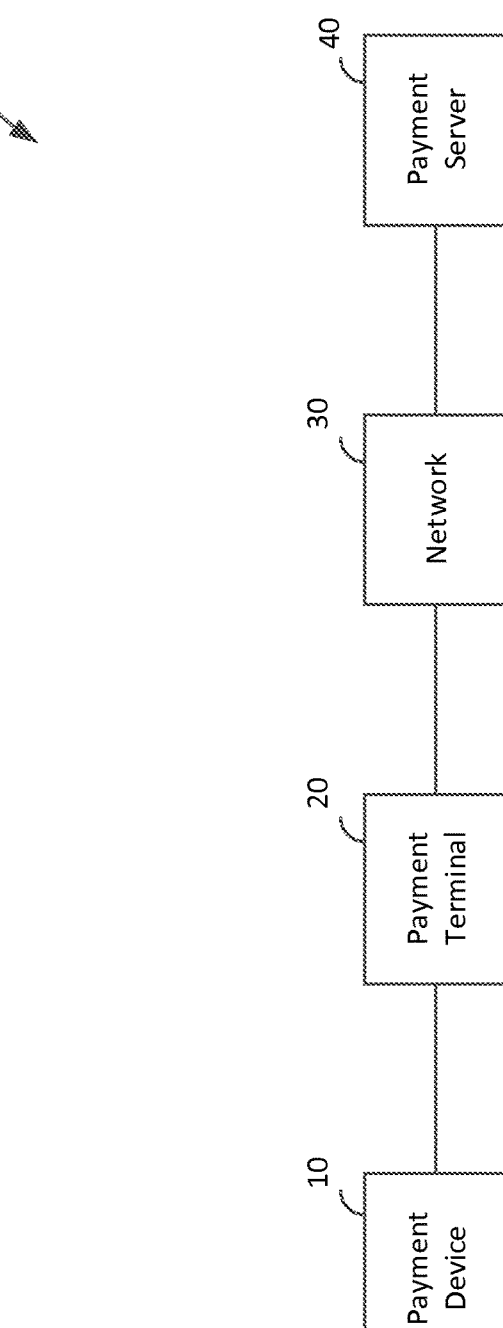
FIG. 1 shows an illustrative block diagram of a payment system in accordance with some embodiments of the present disclosure.

A merchant and a customer may engage in a transaction such as a retail transaction using a merchant device such as a smart phone or tablet running a point-of-sale application. The point-of-sale application may provide a user interface that allows the merchant and customer to enter information about the transaction. In some cases, the merchant device may not have integrated hardware that is able to process the transaction. For example, the merchant device may not have a magnetic credit card reader, a dip-chip interface for receiving a chip payment card, or wireless hardware necessary for near-field communications with a chip payment card or a NFC-enabled mobile device running a payment application. Thus, in some cases the merchant device may communicate with a separate payment reader that is able to process payments according to these methods.

In some implementations, a payment reader may have a battery such that it can be used in different locations without the need to connect to AC power. The payment reader may also be capable of communicating with the merchant device wirelessly, for example, using wireless communication protocols such as Bluetooth classic or Bluetooth low energy. Because the payment reader may operate for extended periods without an opportunity to recharge, it may be desired to limit the power consumption of the payment reader. One way to do this is to enter a sleep mode while transactions are not being processed. In the sleep mode, some or all of the hardware and software of the payment reader is disabled.

When a payment transaction takes place, it may be necessary to wake up the payment reader. Although it may be possible accomplish this by physical interaction with the payment reader—such as pushing a wake up button on the payment reader—in some implementations the wake up may be performed wirelessly using hardware of the payment reader that remains active while in the sleep mode. As one example, a wireless communication protocol such as Bluetooth low energy may be designed to consume only a limited amount of power, and may remain active during the sleep mode. The merchant device may communicate with the payment reader using Bluetooth low energy, and based on those communications, the payment reader may wake up the remaining hardware and software. Communication between the merchant device and the payment reader may then switch to a different wireless communication protocol that may have a higher data rate, such as Bluetooth classic.

While in sleep mode, the payment reader may send an advertising message, while the merchant device may monitor for the advertising message. When the merchant device wishes to wake up the payment reader, it processes the advertising message to confirm that it is from the payment reader (e.g., based on an identifier sent in the payload of the advertising message), and sends a request message in response to the advertising message. The payment reader receives the request message and confirms that it is from the merchant device (e.g., based on an identifier sent in the payload of the request message). The payment reader may then wake up, including waking up the Bluetooth classic interface.

Once a connection is established via the Bluetooth classic interface, the payment reader and merchant device may process the payment transaction. Once the payment transaction is complete, the payment reader may again enter the sleep mode. In some cases, the payment reader and merchant device may maintain a Bluetooth low energy connection once the sleep mode is entered. Thus, future wake up messages may be sent using the Bluetooth low energy connection, which does not require the payment reader to transmit advertising messages.

FIG. 1 depicts an illustrative block diagram of a payment system 1 in accordance with some embodiments of the present disclosure. In one embodiment, payment system 1 includes a payment device 10, payment terminal 20, network 30, and payment server 40. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10), the initial processing and approval of the payment transaction may be processed at payment terminal 20. In other embodiments, payment terminal 20 may communicate with payment server 40 over network 30. Although payment server 40 is depicted as a single simplified block, it will be understood that payment server 40 may include any suitable number of servers operated by any suitable entities, such as a payment service system and one or more banks of the merchant and customer. The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
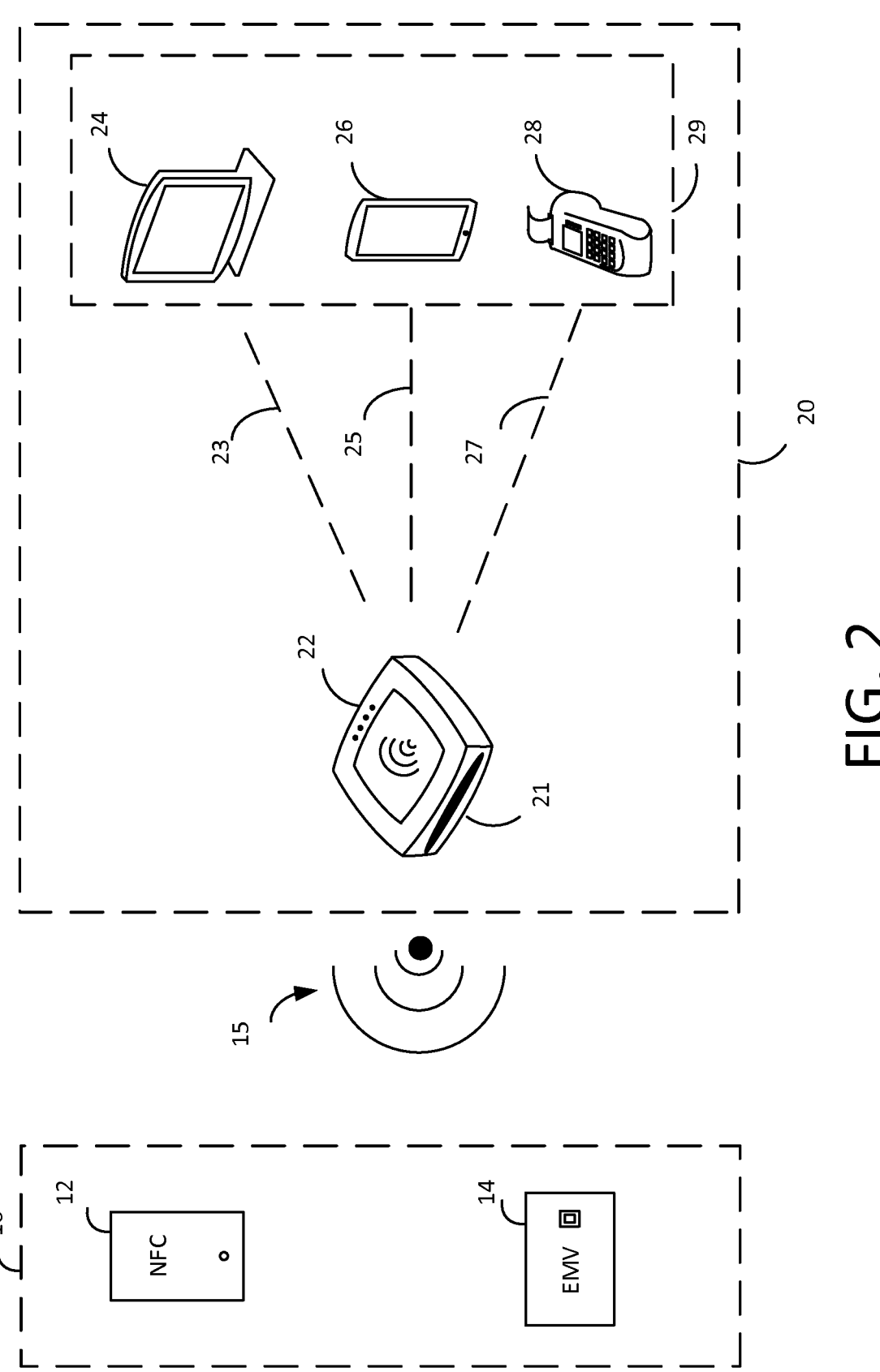
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. The payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15 it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a seller computing device such as tablet payment device 24 or mobile payment device 26, a point-of-sale application may provide for the entry of purchase and payment information, interaction with a customer, and communications with a payment server. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, lightning) or wireless (e.g., Wi-Fi, Bluetooth, NFC, or ZigBee) connection, in one embodiment payment reader 22 may communicate with the merchant device 29 via both Bluetooth classic and Bluetooth low energy interfaces. In some embodiments processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such as TLS or SSL.

Figure 3:
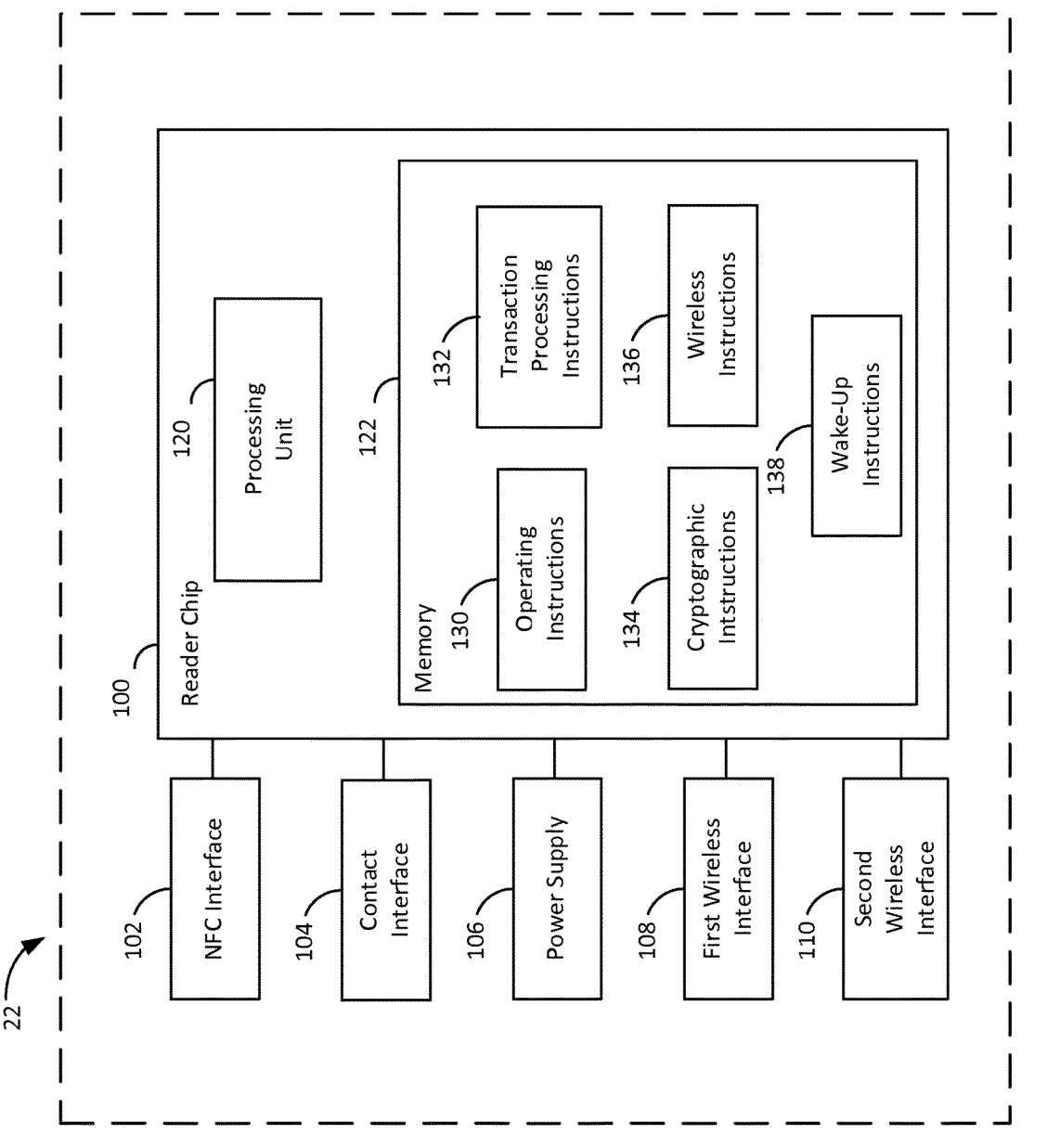
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a transaction processing device that communicates wirelessly with a seller mobile device such as a merchant device 29 using Bluetooth classic or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner.

In one embodiment, payment reader 22 includes a reader chip 100, a payment interface including a NFC interface 102 and a contact interface 104, a power supply 106, a first wireless communication interface 108, and a second wireless communication interface 110. Payment reader also includes a processing unit 120 and memory 122. Although in one embodiment the processing unit 120 and memory 122 will be described as packaged in a reader chip 100 and configured in particular manner, it will be understood that processing unit 120 and memory 122 may be configured in any suitable manner to perform the functionality of the payment reader 22 as is described herein.

Processing unit 120 of reader chip 100 of payment reader 22 may include any suitable hardware, software, memory, and circuitry as is necessary to perform and control the functions of payment reader 22. A processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language (HDL) software used for designing chips.

In an exemplary embodiment, the processing unit 120 of reader chip 100 may include two RISC processors configured to perform general processing and cryptographic processing functions based on instructions stored in memory 122, respectively. As used herein, memory may refer to a tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, and security circuitry. In one embodiment, interface circuitry may include circuitry for interfacing with a first wireless communication interface 108 (e.g., Bluetooth low energy), circuitry for interfacing with a second wireless interface 110 (e.g., Bluetooth classic), circuitry for interfacing with a wired interface (not depicted) (e.g., USB, Ethernet, Fire-Wire, and lightning), circuitry for interfacing with other communication interfaces or buses (e.g., I²C, SPI, UART, and GPIO), circuitry for interfacing with a power supply 106 (e.g., power management circuitry, power conversion circuitry, rectifiers, and battery charging circuitry), and circuitry for interfacing with a contact interface 104 (e.g., power and communication circuitry for directly interfacing with an EMV chip of a chip card 14 that is inserted in slot 21).

In one embodiment, analog front end circuitry of reader chip 100 includes circuitry for interfacing with the analog components of NFC interface 102 (e.g., electromagnetic compatibility (EMC) circuitry, matching circuits, modulation circuitry, and measurement circuitry). Security circuitry of reader chip 100 may include circuitry for protecting sensitive information such as encryption keys, merchant information, and customer information. In one embodiment, security circuitry may include tamper protection circuitry and electronic fuses for selectively cutting off power or disabling one or more components of reader chip 100 in response to attempts to obtain improper access to reader chip 100.

NFC interface 102 may provide for NFC communication with a contactless device such as NFC device 12 or chip card 14. Based on a signal provided by reader chip 100, an antenna of NFC interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the NFC interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins for physically interfacing with the chip card 14 according to EMV specifications. The EMV chip of the chip card 14 is provided with power and communicates with the processing unit 120 of the reader chip 100 via the contact pins. In this manner, the payment reader and the chip card are able to exchange information such as payment information.

Power supply 106 may include one or more power supplies such as a physical connection to AC power or a battery. Power supply 106 may include power conversion circuitry for converting AC power and generating a plurality of DC voltages for use by components of payment reader 22. When power supply 106 includes a battery, the battery may be charged via a physical power connection, via inductive charging, or via any other suitable method.

First wireless communication interface 108 may include hardware and software for communicating with external electronic devices using a wireless communication protocol such as Wi-Fi, Bluetooth classic, or Bluetooth low energy. In one embodiment, the first wireless communication interface 108 may be a Bluetooth low energy interface. Although the Bluetooth classic and Bluetooth low energy interfaces of payment reader 22 may be implemented in any suitable manner (e.g., separate hardware for each interface), in one embodiment both interfaces may be implemented as a single system on a chip capable of selectively providing power and operating both Bluetooth classic and Bluetooth low energy interface. As described herein, payment reader 22 may utilize the Bluetooth low energy interface to selectively perform communication functions that require less power consumption than those required by the Bluetooth classic interface. For example, where the lower data rate of Bluetooth low energy is acceptable, communications between payment reader 22 and merchant device 29 may occur over the Bluetooth low energy interface. For frequent communications such as the broadcast of advertising messages, the use of Bluetooth low energy may result in reduced power consumption for the payment reader 22.

Second wireless interface 110 may include hardware and software for communicating with external electronic devices using a wireless communication protocol such as Wi-Fi, Bluetooth classic, or Bluetooth low energy. In one embodiment, the second wireless communication interface 110 may be a Bluetooth classic interface. As described herein, payment reader 22 may establish a Bluetooth classic connection with the merchant device 29. The merchant device 29 may be running a point-of-sale application that is compatible with the payment reader 22 in order to process payment transactions. Although the Bluetooth classic connection may be established in any suitable manner, in one embodiment the merchant device 29 may function as a master and the payment reader 22 may function as a slave, with each device requesting and sending information as necessary to facilitate electronic payment transactions and other functionality implemented by the point-of-sale application of the merchant device 29 and the payment reader.

Memory 122 may include a plurality of sets of instructions for performing the processing operations of payment reader 22, such as operating instructions 130, transaction processing instructions 132, cryptographic instructions 134, wireless communication instructions 136, and wake-up instructions 138. Although not depicted in FIG. 3, in some embodiments sensitive information such as the cryptographic instructions 132, encryption keys, passwords, and other similar information may be stored in a logically and physically distinct memory from the other instructions and storage.

Operating instructions 130 may include instructions for controlling any suitable general operations of the payment reader 22, such as internal communications, power management, processing of messages, system monitoring, sleep modes, user interface response and control, and the management of the other sets of instructions. In one embodiment, the operating instructions 130 may provide the operating system and applications necessary to perform most of the processing operations that are performed by the processing unit 120 of the reader chip 100 of payment reader 22.

In addition, operating instructions 130 may include instructions for controlling the interaction between the payment reader 22 and a payment device (e.g., for interfacing with a payment device via the NFC interface 102 and contact interface 104). In one embodiment, the operating instructions may include instructions for generating a wireless carrier signal, providing the wireless carrier signal to NFC interface 102 (e.g., via analog front end circuitry), modulating the wireless carrier signal based on data to be transmitted according to a communication protocol, receiving a modulated wireless carrier signal from the NFC interface 102 (e.g., via analog front end circuitry), demodulating the received modulated wireless carrier signal according to a communication protocol, and determining received data from the demodulated signal.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via first wireless interface 108 and/or second wireless interface 110, based on wireless instructions 136). The operating instructions 130 facilitate processing of this payment, for example, by acquiring payment information via the NFC interface 102 or contact interface 104, invoking the transaction processing instructions 132 and cryptographic instructions 134 to process that payment information, and by generating responsive messages that are transmitted to the point-of-sale application of the merchant device 29 via first wireless interface 108 and/or second wireless interface 110, based on wireless instructions 136.

Operating instructions 130 may also include instructions for interacting with a payment service system of payment server 40. In one embodiment, a payment service system may be associated with the payment reader 22 and the point-of-sale application of the merchant device 29. For example, the payment service system may have information about payment readers 22 and merchant devices 29 that are registered with the payment service system (e.g., based on unique identifiers). This information may be used to process transactions with servers of the merchant and customer financial institutions, for providing analysis and reports to a merchant, and aggregating transaction data. The payment reader 22 may process payment information (e.g., based on the transaction processing instructions 132 and the cryptographic instructions 134) and communicate that processed payment information to the point-of-sale application of merchant device 29, which in turn communicates with the payment service system. In this manner, messages from the payment reader 22 may be forwarded to the payment service system of payment server 40, such that the payment reader 22 and payment service system may collectively process the payment transaction.

Transaction processing instructions 132 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions.

Cryptographic instructions 134 may include instructions for performing cryptographic operations. Processing unit 120 may execute the cryptographic instructions to perform a variety of cryptographic functions, such as to encrypt or decrypt payment and transaction information as part of a payment transaction. In one embodiment, the payment reader 22 may have one or more keys that are stored in memory 122 (e.g., in a logically and physically distinct portion of the memory 122) and that correspond to one or more keys that are stored at payment service system at a payment server 40. Although any suitable type of keys may be used in accordance with the present disclosure, in some embodiments the keys may include a public/private key pair or a shared private key.

Wireless communication instructions 136 may include instructions for communicating wirelessly with other devices such as mobile seller devices (e.g., merchant device 29). Although wireless communication instructions 136 may be used for any suitable wireless communications interface, in one embodiment, the first wireless communication interface 108 may be a Bluetooth low energy interface and the second wireless communication interface 110 may be Bluetooth classic interface. The wireless communication instructions 136 may control the operations of these two interfaces. Processing unit 120 may execute the wireless communication instructions 136 to send and receive messages (e.g., in broadcast or connected modes) to communicate with the merchant device 29.

Wake-up instructions 138 may include instructions for entering and exiting from one or more power-saving sleep modes. The payment reader 22 may operate on battery power for an extended period of time. If the payment reader 22 is on, but is not within range of a merchant device 29 running a point-of-sale application, it may not be necessary to provide power for all of the functionality of the payment reader 22. In some instances when the payment reader 29 is within range of a payment reader 29, it may not be necessary for merchant device 29 and payment reader 22 to be in constant communication. For example, a merchant may only need to process payment transactions occasionally. If all of the functionality of the payment reader 22 is operational while transactions are not being processed, this may result in an unnecessary use of energy and the loss of battery power.

During a sleep mode, much of the physical circuitry of the payment reader 22 may be disabled and the processor may only execute a limited set of instructions. In one embodiment, during the sleep mode the power supply 106 may only provide a limited subset of the available voltage outputs. Circuitry including the NFC interface 102, contact interface 104, and second wireless communication interface 110 (e.g., a Bluetooth classic interface) may be disabled. The processing unit 120 may only perform a limited subset of instructions, such as a limited subset of the operating instructions 130 (e.g., those operating instructions 130 that are necessary to operate the processing unit and first wireless communication interface 108 while in the sleep mode), the wireless communication instructions 136 associated with the first wireless communication interface 108, and the wake-up instructions 138.

The first wireless communication interface 108 (e.g., the Bluetooth low energy interface) may be operational during the sleep mode. In one embodiment, whenever the sleep mode is entered all wireless communication connections (e.g., both the Bluetooth classic and Bluetooth low energy connections) may be disconnected. The second wireless communication interface may wake up on a periodic basis and broadcast a message such as an advertising message. The advertising message may include any suitable information such as an address associated with the first wireless communication interface 108 of the payment reader 22 and/or an identifier for the payment reader 22 (e.g., provided within the payload of the advertising message).

A merchant device 29 running a point-of-sale application and wishing to process a transaction may utilize this identifying information (e.g., based on a white list or a known association with the payment reader 20) to determine whether to send a request message to wake up the payment reader 22. For example, the merchant device 29 may check to confirm that the received identifier corresponds to a payment reader 22 that is registered within the payment system 1. If the merchant device 29 wishes to respond to the advertising message, it may provide a request message. In one embodiment, the request message may include an identifier for the merchant device 29 or the point-of-sale application running on the merchant device. The payment reader 22 may use this identifier to determine whether to wake up in response to the request message, for example, by confirming that the merchant device 29 and/or point-of-sale application is registered within the payment system 1.

If the payment reader wakes up, all of the components of payment reader 22 may return to normal operation and a payment transaction may be processed. In one embodiment, the payment reader 22 and merchant device 29 may establish a Bluetooth classic connection for performing the payment transaction. Once the payment transaction is complete (e.g., after the expiration of a threshold time since the processing of the payment transaction) or if a payment transaction does not occur within a threshold time period, the payment reader 22 may return to the sleep mode. In some embodiments, the first wireless communication interface 108 may have established a connection with the merchant device 29 (e.g., a Bluetooth low energy connection). Rather than disconnecting in response to the sleep mode, the first wireless communication interface 108 may maintain this connection such that it may periodically listen for messages sent by the merchant device 29 (e.g., according to a predetermined idle time established by the merchant device 29 and payment reader 22). As long as the devices remain connected, the wake-up for the payment reader may be performed based on a connected message provided by the merchant device 29. In some embodiments, the payment device 22 may not send advertising messages as long as the connection is active.

Figure 4:
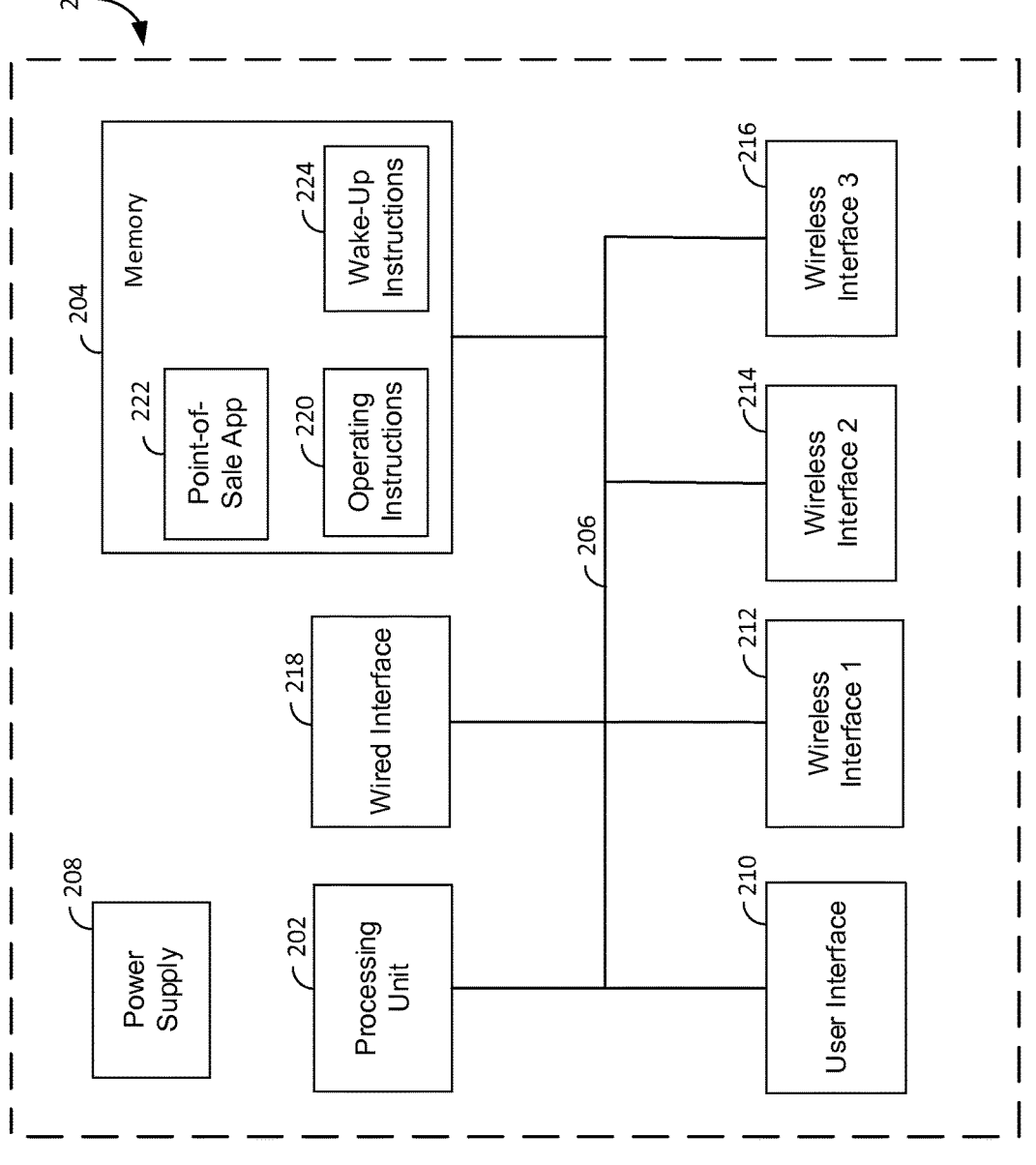
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be a seller mobile device that provides a user interface and communicates with one or more other devices. Examples of seller mobile devices include tablets, smart phones, smart watches, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, a third wireless interface 216, and a wired interface 218.

In one embodiment, the merchant device 29 includes a processing unit 202 and memory 204 that are configured to control and perform the necessary operations of the merchant device 29. In one embodiment, the processing unit 202 of may be a general purpose processor running instructions for a mobile operating system, programs, and applications based on instructions that may be stored in memory 204. The memory may include any suitable memory types or combination thereof as described herein, such as flash memory and RAM memory, for storing instructions and other data and providing a working memory for the execution of the operating system, programs, and applications of the merchant device 29. In one embodiment, the memory may include a plurality of sets of instructions, such as operating instructions 220, point-of-sale application instructions 222, and wake-up instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant device 29.

In one embodiment, a point-of-sale application running on the merchant device 29 may provide a display on user interface 210. The point-of-sale application may facilitate the entry of items to be purchased, for example, via a menu system, scanner, or any other suitable method. Once the interactions with the user interface 210 have proceeded to a predetermined point, processing to send a wake-up message to the payment reader 22 may commence. The predetermined point may be at any suitable point within the payment transaction, such as when the payment transaction begins, when the first item is entered into the point-of-sale application, once the tax or tip are determined, or when the merchant indicates that the transaction is finalized. In some embodiments, the point-of-sale application may also provide for a display on the user interface that allows a user to selectively wake up the payment reader, without regard to whether a payment transaction is occurring.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. In one embodiment, a first wireless communication interface 212 may be a Bluetooth low energy wireless communication interface that communicates with payment reader 22, a second wireless communication interface 214 may be a Bluetooth classic wireless communication interface that communicates with payment reader 22, and a third wireless communication interface may be a wireless communication interface (e.g., WiFi) that communicates with a payment service system of payment server 40 (e.g., via the internet).

Merchant device may also include a wired interface 218, which may include any suitable interface for wired communication with other devices or a communication network, such as USB, Lightning, FireWire, Ethernet, any other suitable wired communication interface, or any combination thereof. In one embodiment, the wired interface 218 may include an interface for communication with a payment reader (e.g., via a USB connection) and with a payment service system of a payment server 40 (e.g., via an Ethernet connection).

Memory 204 may include a plurality of sets of instructions for performing the processing operations of merchant device 29, such as operating instructions 220, point-of-sale application instructions 222, wake-up instructions 224, and any other suitable instructions for operating the merchant device 29 (e.g., instructions related to the operation of one or more other applications or components of the merchant device 29).

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29. For example, operating instructions 220 may include most instructions for the operation of merchant device 29 with the exception of the point-of-sale application instructions 222 and the wake-up instructions 224.

Operating instructions 220 may include instructions for controlling the operations of the user interface 210. The user interface may be controlled in accordance with the instructions of programs and applications of the operating instructions 220, which may provide the user interface in response to the point-of-sale application instructions 222 and the wake-up instructions 224. As described herein, the point-of-sale application instructions 222 may provide for a display to process payment transactions and/or a selection to wake up the payment reader. During the processing of the payment transaction, or in response to a selection to wake up the payment reader 22, the wake-up instructions 224 may be invoked.

Operating instructions 220 may also include instructions for interacting with a payment reader 22. In one embodiment, in response to a payment transaction or a wake-up selection via the user interface 210, the wake-up instructions 224 may be executed to generate a request to monitor and/or provide messages (e.g., Bluetooth low energy messages transmitted via first wireless interface 212) to the payment reader 22 in order to wake up the payment reader 22. The operating instructions 220 may extract payload data (e.g., an identifier for the payment reader 22) from received messages and may transmit pay load data (e.g., an identifier for the merchant device 29 and/or the point-of-sale application) to the payment reader 22.

Operating instructions 220 may also include instructions for interacting with a payment service system at a payment server 40. The payment reader 22 and/or the application running on the merchant device 29 may be known (e.g., via a registration process) to the payment service system, such that the merchant device 29 may process payments with the payment service system according to the point-of-sale application instructions.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations.

As described herein, the point-of-sale application instructions 222 also provide instructions for determining when to wake up a payment reader 22 such that it can receive payment information from a payment device such as a NFC device 12 or a chip card 14. The wake up may be provided at any suitable point during a payment transaction, in response to a wake-up selection via the user interface 210, or at any other suitable time (e.g., in order to configure the payment reader 22, provide software updates to a payment reader 22, etc.). In some embodiments, the point-of-sale application instructions 222 may also include instructions to initiate a wake up of the payment reader from another source, such as a payment service system of a payment server 40.

Wake-up instructions 224 include instructions for waking up the payment reader 22. As described herein, processor 204 may execute instructions (e.g., point-of-sale application instructions 222) that request that the payment reader 22 wake up. Once such a request is received, the processor 204 may execute the wake-up instructions 224 to perform the wake up process. In one embodiment, the merchant device 29 may wake up the payment reader 22 by sending and receiving messages over the first wireless communication interface 212 (e.g., a Bluetooth low energy interface). If the merchant device 29 is connected to the payment reader 22 (e.g., a Bluetooth low energy connection), the merchant device 29 and payment reader 22 may have established idle times during which no messages are exchanged and transmit times during which the devices may exchange messages. Although the devices may operate in any suitable manner, in one embodiment the merchant device 29 may function as a Bluetooth low energy central or master, and the payment reader 22 may function as a Bluetooth low energy peripheral or slave. The idle time and transmit time may be set in any suitable manner, for example, with a frequency that permits the payment reader 22 to be responsive to a wake up request, but that is relatively infrequent in order to avoid excessive power consumption by the payment reader while in the sleep mode.

If the merchant device 29 is not connected to the payment reader 22, the merchant device 29 may monitor the first wireless interface 212 (e.g., a Bluetooth low energy interface) for advertising messages from the payment reader 22. If an advertising message is received, the wake-up instructions 224 may be executed by processor 202 in order to wake up the payment reader 22. In one embodiment, a request message may be provided in response to the advertising message, and the payment reader 22 may wake up upon receiving the request message. In other embodiments, one or both of the merchant device 29 and payment reader 22 may confirm that the wake up should occur. This confirmation may be performed in any suitable manner, for example, based on a white list associated with a Bluetooth low energy protocol or an identifier sent within a message payload. In an exemplary embodiment involving an identifier, an identifier for the payment reader may be extracted from the advertising message sent by the payment reader. An identifier may be a code that identifies that the device sending the advertising message is in fact a payment reader, or in some embodiments, may be unique identifier for the payment reader 22. The merchant device may confirm that the payment reader 22 should receive the wake up message based on the identifier, or in some embodiments, may communicate with another device such as the payment service system of payment server 40 to confirm that the wake up should occur. If the wake up should occur, merchant device 29 may transmit a request message to the payment reader 22. In some embodiments, the request message may also include an identifier that may be processed by the payment reader 22 to determine whether the payment reader 22 should wake up in response to the request message. The merchant device 29 may also monitor for a response message from payment reader 22, which may confirm that the payment reader 22 woke up in response to the request message.

Figure 5:
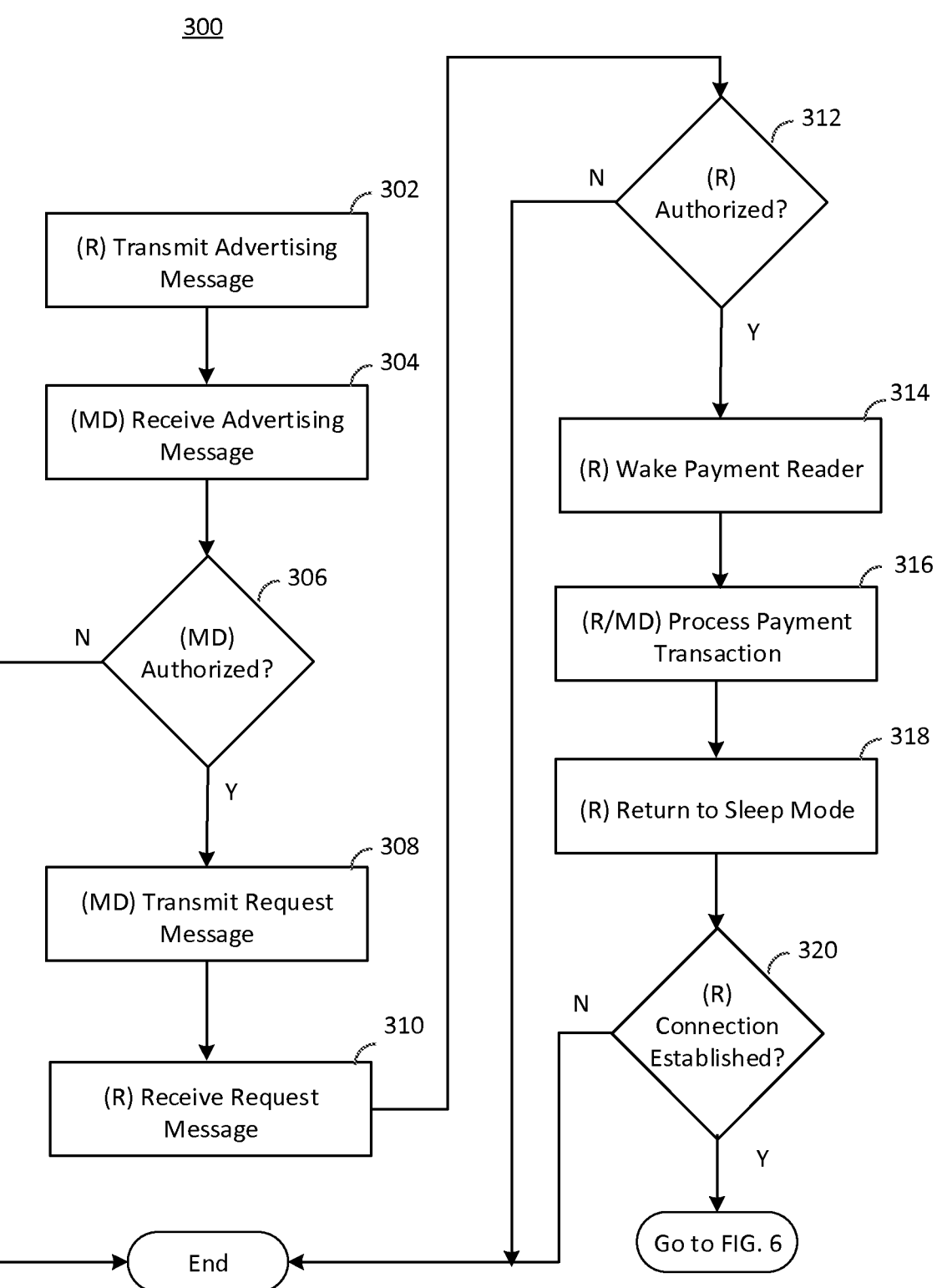
FIG. 5 depicts a non-limiting flow diagram illustrating an exemplary method for waking up a payment reader in accordance with some embodiments of the present disclosure.
Figure 6:
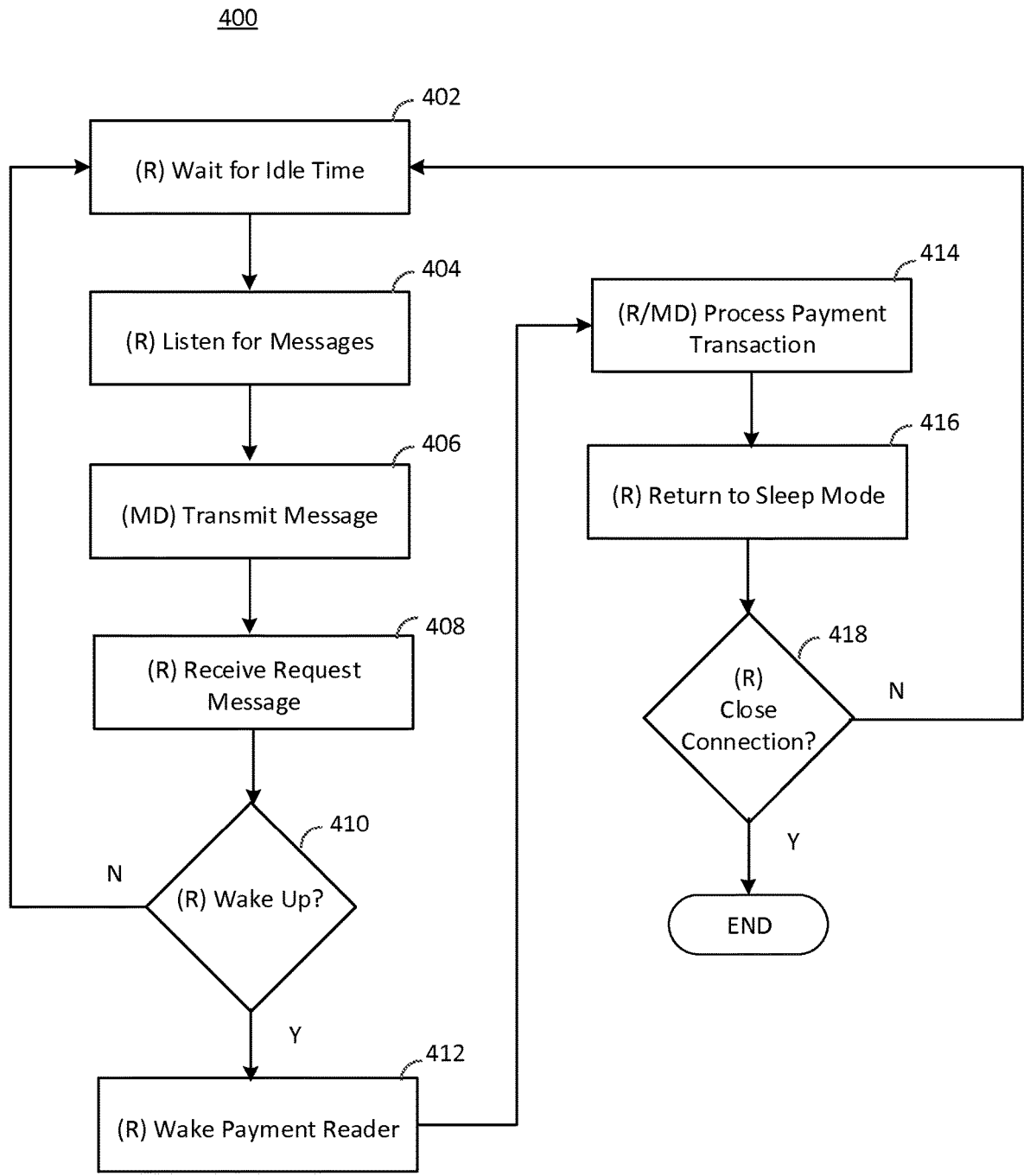
FIG. 6 depicts a non-limiting flow diagram illustrating an exemplary method for waking up a payment reader in a connected mode in accordance with some embodiments of the present disclosure.

In view of the structures and devices described supra, methods that can be implemented in accordance with the disclosed subject matter will be better appreciated with reference to the flowcharts of FIGS. 5-6. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 5 depicts steps 300 for waking up a wireless communication device such as a payment reader 22 and processing a payment transaction between the payment reader 22 and a device such as a merchant device 29 in accordance with some embodiments of the present disclosure. In one embodiment, as is depicted in FIGS. 5-6, steps are performed by a wireless communication device such as a payment reader 22 (indicated with an (R) in FIGS. 5-6) and a device such as a merchant device 29 (indicated with an (MD) in FIGS. 5-6). Although these steps are described as being performed by particular devices in this embodiment, it will be understood that the allocation of the steps between the devices may be modified in any suitable manner or that the number of devices performing the steps may be modified in any suitable manner.

At step 302, processing unit 120 of payment reader 22 may generate an advertising message and transmit the advertising message via first wireless communication interface 108 (e.g., a Bluetooth low energy interface) based on wireless instructions 136 and wake-up instructions 138. At this initial step, the payment reader 22 may not be connected to a merchant device 29, and may be operating a in a sleep mode with many of the components and processing functions of payment reader 22 disabled. At certain times (e.g., on a periodic basis), the payment reader may generate an advertising message which may include payload data such as an identifier for the payment reader. The advertising message may then be transmitted (e.g., as an unencrypted broadcast message). Processing may then continue to step 304.

At step 304, processing unit 202 of merchant device 29 may receive the advertising message via first wireless communication interface 212 (e.g., a Bluetooth low energy interface) based on operating instructions 220 and wake-up instructions 224. Once the advertising message is received, processing may continue to step 306.

At step 306, processing unit 202 of merchant device 29 may check whether the payment reader 22 is authorized based on the operating instructions 220 and wake-up instructions 224. The message may be received and information from the message such as an address of the sender and/or an identifier of the payment reader may be extracted from the received message. In some embodiments, merchant device 29 may confirm that message was received from a suitable payment reader (e.g., that the payment reader is authorized to process transactions with a point-of-sale application running on the merchant device 29). In one embodiment, data such as an identifier may identify a type of device, which may confirm that the originator of the message is in fact a compatible payment reader 22. In other embodiments, a unique identifier may be checked at the merchant device 29 or a payment service system of the payment server 40, for example, to confirm that the particular payment reader is authorized to process transactions within the payment system. If the payment reader 22 is authorized, processing may continue to step 308. If the payment reader is not authorized, processing of steps 300 may end.

At step 308, processing unit 202 of merchant device 29 may generate a request message and transmit the request message via the first wireless communication interface 212 based on the operating instructions 220, point-of-sale application instructions 222, and wake-up instructions 224. In one embodiment, the request message may be a message that is sent in response to an advertising message in accordance with a Bluetooth low energy protocol. The request message may also include payload data, which in one embodiment may include an identifier for the merchant device 29 and/or a point-of-sale payment application. In some embodiments, the identifier may identify that the request message was sent by a merchant device running a point-of-sale application, while in other embodiments the identifier may be a unique identifier for the merchant device and/or the point-of-sale application. Once the request message is transmitted, processing may continue to step. 310.

At step 310, processing unit 120 of payment reader 22 may receive the request message via first wireless communication interface 108 (e.g., a Bluetooth low energy interface) based on wireless instructions 136 and wake-up instructions 138. Once the request message is received, processing may continue to step 312.

At step 312, processing unit 120 of payment reader 22 may check whether the merchant device 29 and/or the point-of-sale application are authorized based on the operating instructions 130 and wake-up instructions 138. The request message may be received and information from the request message such as an address of the sender and/or an identifier of the merchant device and/or point-of-sale application may be extracted from the received message. In some embodiments, payment reader 22 may confirm that the message was received from a suitable merchant device running a point-of-sale application (e.g., that the merchant device and point-of-sale application are authorized to process transactions with the payment reader 22). In one embodiment, data such as an identifier may identify a type of device and/or point-of-sale application, which may confirm that the originator of the message is in fact a compatible merchant device running a compatible point-of-sale application. In other embodiments, a unique identifier may be checked at the payment reader 22, to confirm that the particular merchant device and/or point-of-sale application are authorized to process transactions within the payment system. If the merchant device and/or point-of-sale application are authorized, processing may continue to step 314. If they are not authorized, processing of steps 300 may end.

At step 314, processing unit 120 of payment reader 22 may wake the payment reader 22 based on the operating instructions 130 and wake-up instructions 138. Power supply 106 may provide all output voltages to all components of the system, and components such as NFC interface 102, contact interface 104, and second wireless interface 110 may receive power and become enabled. Processing unit 120 may execute the full set of available instructions from memory 122, including all of the operating instructions 130, transaction processing instructions 132, cryptographic instructions 134, and wireless instructions 136. In some embodiments, once the payment reader 22 is awake, a response message may be sent to the merchant device indicating that the wake up was successful. In additional embodiments, the payment reader 22 and merchant device 29 may establish a Bluetooth low energy connection, such that additional data may be sent via the Bluetooth low energy protocol. Processing may then continue to step 316.

At step 316, the merchant device 29 and payment reader 22 may process a transaction based on the processing unit 120 of the payment reader 22 executing instructions from memory 122 (e.g., operating instructions 130, transaction processing instructions 132, cryptographic instructions 134, and wireless instructions 136) and the processing unit 202 of merchant device 29 executing instructions from memory 204 (e.g., operating instructions 220 and point-of-sale application instructions 222). As described herein, the merchant device 29 may receive inputs form a merchant or customer and request payment from payment reader 22. The payment reader may receive payment from a payment device such as a NFC device 12 or a chip card 14, and the payment information may be transmitted to the merchant device 29. The transaction may then be processed locally at the merchant device 29 and payment reader 22, or in some embodiments, based on communications with a payment service system of a payment server 40. Once the transaction has been processed, processing may continue to step 318.

At step 318, processing unit 120 of payment reader 22 may place the payment reader 22 in a sleep mode based on the operating instructions 130 and wake-up instructions 138. Power supply 106 may cease providing some of the output voltages to the components of the system, and components such as NFC interface 102, contact interface 104, and second wireless interface 110 may be disabled or may lose power. Processing unit 120 may execute only a limited set of instructions from memory 122, such as a subset of the operating instructions 130, a subset of wireless instructions 136, and the wake-up instructions 138. Processing may then continue to step 320.

At step 320, processing unit 120 of payment reader 22 may determine whether a connection was established via the first wireless communication interface 108 (e.g., a Bluetooth low energy interface) based on the operating instructions 130 and wake-up instructions 138. In some embodiments, the payment reader 22 and merchant device 29 may not establish a Bluetooth low energy connection after wake up at step 314. If a connection is not established, processing may end and the next wakeup may occur via an advertising message. However, if a Bluetooth low energy connection is established, additional wake up messages may be sent via the Bluetooth low energy connection, according to the steps 400 depicted and described with respect to FIG. 6

FIG. 6 depicts steps 400 for performing a wake up of a payment reader in a connected state in accordance with some embodiments of the present disclosure. At step 402, processing unit 120 of payment reader 22 may wait for an idle time based on wireless instructions 136 and wake-up instructions 138. Once a connection is established between payment reader 22 and merchant device 29, the central or master device (e.g., merchant device 29) may provide an idle time during which neither the central/master device nor the peripheral/slave device communicate with each other over the Bluetooth low energy connection. Once that idle time as expired, processing may continue to step 404.

At step 404, processing unit 120 of payment reader 22 may monitor the Bluetooth low connection via first wireless communication interface 108 for a message from merchant device 29 based on wireless instructions 136 and wake-up instructions 138. Because the devices have established a connection, it will not be necessary for payment reader 22 to send an advertising message to establish communications with the merchant device 29. Processing may then continue to step 406.

At step 406, processing unit 202 of merchant device 29 may generate a message and transmit the message via first wireless communication interface 212 (e.g., a Bluetooth low energy interface) based on operating instructions 220, point-of-sale application instructions 222, and wake-up instructions 224. For example, the message may be generated at an appropriate point during a payment transaction or based on a selection at the user interface 210 to wake up the payment reader 22. In some embodiments, the message may include information such as an identifier. Once the message is generated, it may be transmitted to the payment reader 22. Processing may then continue to step 408.

At step 408, processing unit 120 of payment reader 22 may receive the message via first wireless communication interface 108 (e.g., via a Bluetooth low energy connection) based on wireless instructions 136 and wake-up instructions 138. Once the message is received, processing may continue to step 410.

At step 410, processing unit 120 of payment reader 22 may check whether the merchant device 29 and/or the point-of-sale application are authorized based on the operating instructions 130 and wake-up instructions 138. The message may be received and information from the message such as an address of the sender and/or an identifier of the merchant device and/or point-of-sale application may be extracted from the received message. In some embodiments, payment reader 22 may simply rely on the fact that the message was sent via the secure connection for this confirmation. In other embodiments, payment reader may confirm whether the message was received from a suitable merchant device running a point-of-sale application based on data such as an identifier, as described herein. If the merchant device and/or point-of-sale application are authorized, processing may continue to step 412. If they are not authorized, processing may return to step 402 to wait for a suitable wake up message.

At step 412, processing unit 120 of payment reader 22 may wake up the payment reader 22 based on the operating instructions 130 and wake-up instructions 138. Power supply 106 may provide all output voltages to all components of the system, and components such as NFC interface 102, contact interface 104, and second wireless interface 110 may receive power and become enabled. Processing unit 120 may execute the full set of available instructions from memory 122, including all of the operating instructions 130, transaction processing instructions 132, cryptographic instructions 134, and wireless instructions 136. Processing may then continue to step 414.

At step 414, the merchant device 29 and payment reader 22 may process a transaction based on the processing unit 120 of the payment reader 22 executing instructions from memory 122 (e.g., operating instructions 130, transaction processing instructions 132, cryptographic instructions 134, and wireless instructions 136) and the processing unit 202 of merchant device 29 executing instructions from memory 204 (e.g., operating instructions 220 and point-of-sale application instructions 222). As described herein, the merchant device 29 may receive inputs form a merchant or customer and request payment from payment reader 22. The payment reader 22 may receive payment form a payment device such as a NFC device 12 or a chip card 14, and the payment information may be transmitted to the merchant device 29. The transaction may then be processed locally at the merchant device 29 and payment reader 22, or in some embodiments, based on communications with a payment service system of a payment server 40. Once the transaction has been processed, processing may continue to step 416.

At step 416, processing unit 120 of payment reader 22 may place the payment reader 22 in a sleep mode based on the operating instructions 130 and wake-up instructions 138. Power supply 106 may cease providing some of the output voltages to the components of the system, and components such as NFC interface 102, contact interface 104, and second wireless interface 110 may be disabled or may lose power. Processing unit 120 may execute only a limited set of instructions from memory 122, such as a subset of the operating instructions 130, a subset of wireless instructions 136, and the wake-up instructions 138. Processing may then continue to step 418.

At step 418, processing unit 120 of payment reader 22 may determine whether the connection with the merchant device 29 should be closed, based on the operating instructions 130, wireless communication instructions 136, and wake-up instructions 138. The connection may be closed for any suitable reason, such as the expiration of a maximum connection time, loss of signal with the merchant device 29, or a request to close the connection from merchant device

29. If the connection is closed at step 418, processing ends. If the connection is not closed at step 418, processing may return to step 402.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment reader comprising:

a first wireless communication interface having first circuitry configured to communicate via a first wireless communication protocol;

a second wireless communication interface having second circuitry configured to communicate via a second wireless communication protocol, wherein the second wireless communication protocol is associated with a higher data rate and a higher power consumption than the first wireless communication protocol;

a payment interface having third circuitry configured to receive payment information from a payment device;

a processor configured to execute one or more instructions stored in a memory to:

receive a first message from a point-of-sale application of a merchant device at the first wireless communication interface of the payment reader while the payment reader is in a sleep mode, wherein the first message is associated with processing a payment transaction, and includes an identifier of at least one of the merchant device and the point-of-sale application installed on the merchant device;

determine whether the merchant device is authorized to process payment transactions with the payment reader based on confirming that the identifier is registered with a payment system;

transition the payment interface and the second wireless communication interface to an active state from the sleep mode, including enabling power to the payment interface and the second wireless communication interface, in response to a determination that the merchant device is authorized to process payment transactions;

execute a set of computer-readable instructions including cryptographic instructions, transaction processing instructions, and wireless instructions that are not executable while the payment reader is in the sleep mode to:

receive the payment information from the payment device at the payment interface;

process the payment transaction in communication with the payment system based at least in part on the cryptographic instructions, and transmit a second message with the received payment information to the point-of-sale application of the merchant device with the second wireless interface at the higher data rate and the higher power consumption.

2. The payment reader of claim 1, wherein the processor is further configured to execute the one or more instructions memory to transmit an advertising message to the merchant device with the first wireless communication interface prior to receiving the first message, and wherein the advertising message comprises an identifier for the payment reader.

3. The payment reader of claim 2, wherein the first message is received by the payment reader after the merchant device determines whether the payment reader is authorized to process payment transactions with the merchant device based on the identifier for the payment reader in the advertising message, and wherein the first message comprises a request message that is responsive to the advertising message.

4. The payment reader of claim 1, wherein the processor is further configured to execute the one or more instructions to establish a connection between the merchant device and the payment reader according to the second wireless communication protocol after transitioning the payment interface and the second wireless communication interface to the active state.

5. The payment reader of claim 4, wherein the processor is further configured to execute the one or more instructions to:

transition the payment interface and the second wireless communication interface to the sleep mode after transmitting the second message; and wait for a predetermined time period, wherein communication between the merchant device and the payment reader is prevented during the predetermined time period.

6. The payment reader of claim 5, wherein the processor is further configured to execute the one or more instructions to receive, after waiting for the predetermined time period, an additional first message from the merchant device at the first wireless communication interface of the payment reader via the established connection.

7. The payment reader of claim 6, wherein the processor is further configured to execute the one or more instructions to, upon receiving the additional first message, transition the payment interface and the second wireless communication interface to the active state, receive the payment information and transmit the second message.

8. The payment reader of claim 1, wherein the first wireless communication protocol comprises a Bluetooth low energy protocol and the second wireless communication protocol comprises a Bluetooth classic protocol.

9. The payment reader of claim 1, wherein the payment interface comprises at least one of an NFC interface or a contact interface.

10. A method for processing payment transactions comprising:

receiving a first message at a first wireless interface of a payment reader while the payment reader is in a sleep mode, wherein the first wireless interface communicates via a first wireless communication protocol, and the first message is from a point-of-sale application of a merchant device, is associated with processing a payment transaction, and includes an identifier of at least one of the merchant device and a point-of-sale application installed on the merchant device;

determining, by a processor of the payment reader, whether the merchant device is authorized to process payment transactions with the payment reader based on confirming that the identifier is registered with a payment system;

transitioning, by the processor of the payment reader, a payment interface of the payment reader and a second wireless interface of the payment reader to an active state from the sleep mode, including enabling power to the payment interface and the second wireless communication interface, in response to a determination that the merchant device is authorized to process payment transactions, wherein the payment interface is configured to receive payment information from a payment device, and wherein the second wireless interface communicates via a second wireless communication protocol associated with a higher data rate and a higher power consumption than the first wireless communication protocol;

executing a set of computer-readable instructions including cryptographic instructions, transaction processing instructions, and wireless instructions that are not executable while the payment reader is in the sleep mode to:

receive the payment information from the payment device at the payment interface;

process the payment transaction in communication with the payment system based at least in part on the cryptographic instructions, generate, by the processor of the payment reader, a second message with the received payment information; and transmit, using the second wireless interface at the higher data rate and the higher power consumption, the second message with the received payment information to the point-of-sale application of the merchant device.

11. The method of claim 10, further comprising:

transmitting, by the first wireless interface, an advertising message from the payment reader prior to receiving the first message, and wherein the first message comprises a request message that is responsive to the advertising message.

12. The method of claim 10, further comprising:

establishing a connection between the merchant device and the payment reader according to the second wireless communication protocol after transitioning the payment interface and the second wireless interface to an active state.

13. The method of claim 12, further comprising:

transitioning, by the processor of the payment reader, the payment interface and the second wireless interface to the sleep mode after transmitting the second message; and waiting a predetermined time period by the payment reader, wherein communication between the merchant device and the payment reader is prevented during the predetermined time period.

14. The method of claim 10, wherein the first wireless communication protocol comprises a Bluetooth low energy protocol and the second wireless communication protocol comprises a Bluetooth classic protocol, and the payment interface comprises at least one of an NFC interface or a contact interface.

15. One or more non-transitory computer-readable media comprising computer-readable instructions, which when executed by one or more processors of a payment reader, cause the payment reader to:

receive a first message at a first wireless interface of a payment reader while the payment reader is in a sleep mode, wherein the first wireless interface communicates via a first wireless communication protocol, and the first message is from a point-of-sale application of a merchant device, is associated with processing a payment transaction, and includes an identifier of at least one of the merchant device and a point-of-sale application installed on the merchant device;

determine whether the merchant device is authorized to process payment transactions with the payment reader based on confirming that the identifier is registered with a payment system;

transition a payment interface of the payment reader and a second wireless interface of the payment reader to an active state from the sleep mode, including enabling power to the payment interface and the second wireless communication interface, in response to a determination that the merchant device is authorized to process payment transactions, wherein the payment interface is configured to receive payment information from a payment device, and wherein the second wireless interface communicates via a second wireless communication protocol associated with a higher data rate and a higher power consumption than the first wireless communication protocol;

execute a set of computer-readable instructions including cryptographic instructions, transaction processing instructions, and wireless instructions that are not executable while the payment reader is in the sleep mode to:

receive the payment information from the payment device at the payment interface;

process the payment transaction in communication with the payment system based at least in part on the cryptographic instructions, generate a second message with the received payment information; and transmit, using the second wireless interface at the higher data rate and the higher power consumption, the second message with the received payment information to the point-of-sale application of the merchant device.

16. The one or more non-transitory computer-readable media of claim 15, wherein execution of the computer-readable media by the one or more processors further cause the payment reader to:

transmit, by the first wireless interface, an advertising message from the payment reader prior to receiving the first message, and wherein the first message comprises a request message that is responsive to the advertising message.

17. The one or more non-transitory computer-readable media of claim 15, wherein execution of the computer-readable media by the one or more processors further cause the payment reader to:

establish a connection between the merchant device and the payment reader according to the first wireless communication protocol after transitioning the payment interface and the second wireless interface to an active state.

18. The one or more non-transitory computer-readable media of claim 17, wherein execution of the computer-readable media by the one or more processors further cause the payment reader to:

transition the payment interface and the second wireless interface to the sleep mode after transmitting the second message; and wait for a predetermined time period by the payment reader, wherein communication between the merchant device and the payment reader is prevented during the predetermined time period.

19. The one or more non-transitory computer-readable media of claim 15, wherein the first wireless communication protocol comprises a Bluetooth low energy protocol and the second wireless communication protocol comprises a Bluetooth classic protocol, and the payment interface comprises at least one of an NFC interface or a contact interface.

20. The payment reader of claim 1, wherein the payment reader is a stand-alone physical unit that is communicatively coupled to the merchant device, and the payment device from which the payment information is received is one of a user device or a magnetic payment instrument presented by a buyer at the payment reader for processing the payment transaction.

* * * * *